United States Patent [19]

Sawai

[11] 4,025,730
[45] May 24, 1977

[54] IN-BAND SIGNAL RECEIVER
[75] Inventor: Akira Sawai, Tokyo, Japan
[73] Assignee: Nippon Electric Company, Ltd., Tokyo, Japan
[22] Filed: Dec. 22, 1975
[21] Appl. No.: 642,822
[30] Foreign Application Priority Data
Dec. 23, 1974 Japan .............. 49-147772
[52] U.S. Cl. .................. 179/84 VF
[51] Int. Cl.² .................. H04M 1/50
[58] Field of Search ........ 179/84 VF, 84 R, 18 AD; 328/137, 138, 139, 167; 324/78 F; 343/100 CL; 235/156

[56] References Cited
UNITED STATES PATENTS 3,636,446  1/1972  Genter ............... 328/138
3,652,805  3/1972  Wisner ............... 179/84 VF
3,679,882  7/1972  McAuliffe ........... 235/156

FOREIGN PATENTS OR APPLICATIONS
1,267,272  3/1966  Germany ............. 179/84 VF Primary Examiner—Kathleen H. Claffy
Assistant Examiner—Joseph A. Popek
Attorney, Agent, or Firm—Sughrue, Rothwell, Mion, Zinn & Macpeak

[57] ABSTRACT

A multifrequency signal receiver for an in-band audio frequency signalling system uses Discrete Fourier Transform or Fast Fourier Transform processing techniques or a combination of both to reliably detect which signalling frequencies have been received. The system has the advantages of digital signal processing without the scale of arithmetic functions ordinarily associated with such processing.

8 Claims, 10 Drawing Figures

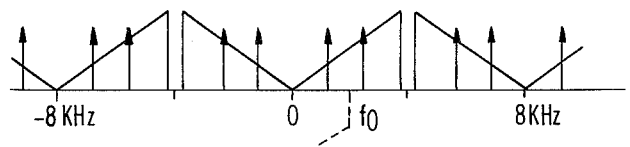
FIG.1a
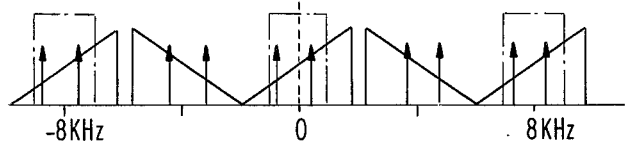
FIG.1b
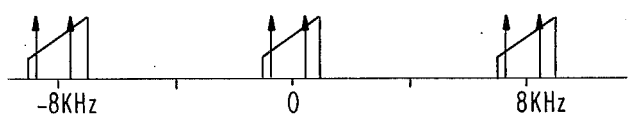
FIG.1c
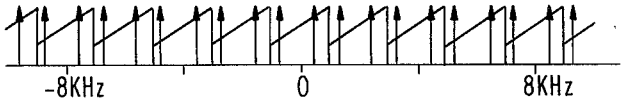
FIG.1d
FIG.2
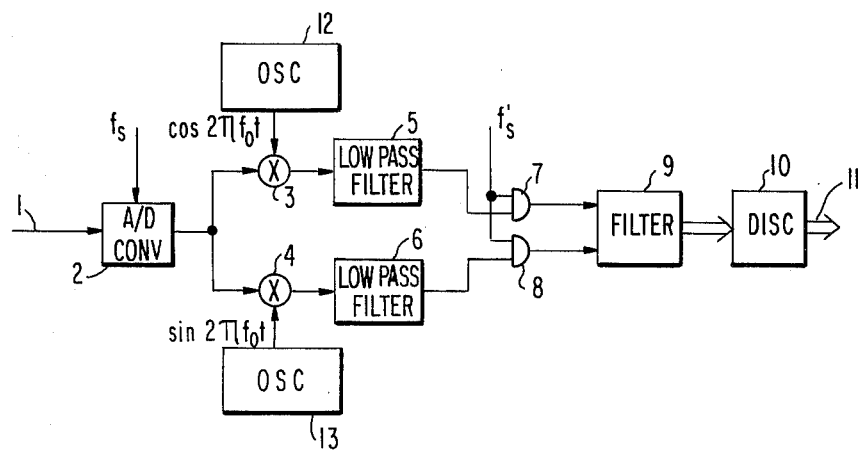
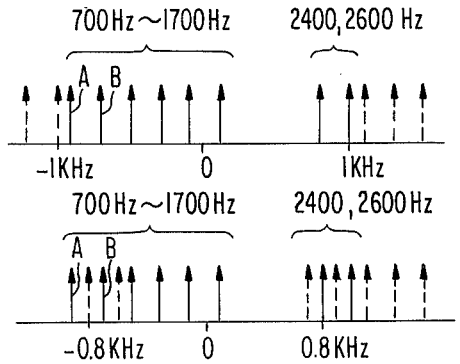
FIG.3a
FIG.3b

IN-BAND SIGNAL RECEIVER

BACKGROUND OF THE INVENTION

The present invention relates to a receiver for an in-band signalling system based on the multifrequency transmission of switching and other information through the audio-frequency band, and especially to such a receiver for use in a multifrequency signalling system employed between telephone exchanges.

In an in-band signalling apparatus for telephone exchanges, one or more sets of sinusoidal signals having predetermined frequencies are transmitted from one exchange to another for signalling purposes. As a typical example, the No. 5 signalling system standardized in 1964 by CCITT is known. In this system, the so-called register signals representing an office number and a subscriber number of a called party are composed of two predetermined frequencies selected out of six frequencies arranged from 700 Hz to 1700 Hz at invervals of 200 Hz. In addition, at frequencies 2400 Hz and 2600 Hz in the No. 5 signalling system, the line signals exist to control an in-band signal receiver and a metering device in a called office to be triggered upon start and termination of communication. The line signals are generally called "supervisory signals", and are interchanged between the telephone exchanges in a predetermined sequence. Since details of the signals and the signalling procedure in the No. 5 signalling system are disclosed on pages 312 to 314 and 323 to 327 of "Green Book", Vol. VI-2 published in 1973 by The International Telecommunication Union, further description will be omitted here. In short, basic operations for detecting the multifrequency signals discussed above are to determine whether or not a received signal belongs to a group of predetermined multifrequency signals, and if so, what is meant by that signal. In the conventional system, such a receiver for the in-band signalling has a plurality of analog band-pass filters having the pass-band centers at the respective frequencies of sinusoidal waves, subsequent rectifier circuits, analog low-pass filters and threshold value circuits. However, it is indispensable that these circuits must be stable and be of high precision over a long period of time under various environmental conditions such as temperature variation, aging variation, etc. Consequently, a great deal of labor is required for the selection of part elements employed in the respective circuits, the adjustment after the circuit assembly and so on, and also the reduction of the production cost was limited.

The development of the LSI (Large Scale Integration) technique due to the advance of semiconductor techniques, and the rapid development of the digital technology supported by the former are replacing some of the circuits employed in communication apparatuses traditionally composed of analog circuits by digital circuits. This trend is due to the following reasons. In digital signal processing, the processed information is a digital quantity and the processing circuits are also digital, so that the manufacture of the apparatus which is stable and of high precision over a long period of time is possible, provided of course that the clock frequency is stable, and the adjustment process for the production of the apparatus which is indispensible in the case of the use of the analog circuits for constructing the aforementioned receiver can be omitted. Furthermore, enhancement of the productivity as well as the reduction in size and economy of the apparatus can be greatly expected owing to the circuit integration into an IC (integrated circuit) or an LSI.

A digital receiver for use in an in-band signalling system has been already reported in an article titled "An All Digital Telephone Signalling Module" published in the *Proceedings of the National Electronics Conference*, October 1973, and also in a article titled "Digtal MF Receiver Using Discrete Fourier Transform" appearing in the *IEEE Transactions on Communications*, Vol. COM-21, pp. 1331–1335, December 1973 (Reference 1). In the former article, band-pass filter characteristics are obtained by means of a digital filter, while in the latter article, in place of the digital filter, Discrete Fourier Transformation is adopted. The features common to these digital signal receiving systems are that digital signal processing is based on the same sampling frequency used for encoding a voice signal and that various functions of analog circuits are almost directly replaced by those of digital circuits, and hence, the amount of multiplication, addition and substraction in the signal processing is, as a whole, large, so that the increase in the apparatus size is unavoidable.

SUMMARY OF THE INVENTION

It is, therefore, an object of the present invention to provide a signal receiver for use in an in-band signalling system in which the scale of the necessary arithmetic functions is in itself reduced.

The in-band signal receiver utilizing a voice-frequency band according to the present invention, comprises: two oscillators for generating a sine wave and a cosine wave, respectively, having a predetermining frequency at a center portion of the frequency arrangement of the multi-frequency signals to be interposed within said band; two multipliers for obtaining modulation products of the respective outputs of said two oscillators and an output of an analog-digital converter for converting an input in-band signal into a digital signal after sampling at a first sampling frequency; two low-pass filters connected to respective outputs of these two multipliers and having cut-off frequencies preset so as not to affect any one of the multifrequency signals; two sampling gate circuits for sampling the respective outputs of the low-pass filters at a second sampling frequency having a value of an integral fraction of the first sampling frequency selected within the frequency range so that the mutlifrequency signal information may not be affected; filtering means connected to the respective outputs of the two sampling gate circuits for deriving amplitude information possessed by each of the multifrequency signals from the output signals of the sampling gate circuits; and discriminating means for determining on the basis of the output of the filtering means which one of the multifrequency signals has arrived at the signalling receiver.

BRIEF DESCRIPTION OF THE DRAWINGS

The present invention will now be described more in detail in conjunction with the accompanying drawings, in which:

FIGS. 1a, 1b, 1c and 1d are diagrams illustrating the principle of the present invention;

FIG. 2 shows a block diagram of a first embodiment of the present invention;

FIGS. 3a and 3b are diagrams of an arrangement of a multifrequency signal spectrum used for explaining the embodiment in FIG. 2;

DESCRIPTION OF THE PREFERRED EMBODIMENT

Figure 4A:
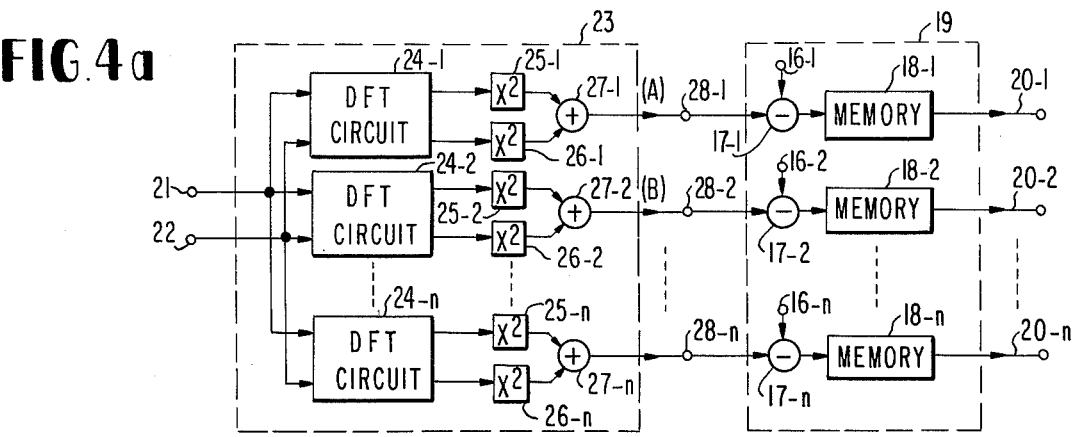
FIGS. 4a and 4b show schematic circuit diagrams of one structural element of FIG. 2.

The present invention is based on the lowering of the signal sampling frequency assigning only a signle sideband to the multifrequency signals. It has been in the international standard that a sampling frequency for encoding a voice signal is selected at 8 kilohertz (kHz). The spectrum of the voice signal sampled at 8 kHz as described above has a periodicity of 8 kHz as illustrated by triangles in FIG. 1a. However, as a practical matter, sufficient information is contained in the frequency spectrum lying within the 4 kHz band, so that the sampling frequency of 8 kHz is not always necessary if appropriate means is provided. The signal processing becomes possible even if the frequency spectrum is selected equal to or lower than 4 kHz. What is to be further noted is the fact that the frequency range where the multifrequency signals (indicated by arrows in FIG. 1) exist, is far smaller than the band of 4 kHz. For instance, since in the aforementioned No. 5 signalling system, a band of 1900 kHz in width extending from 700 Hz to 2600 Hz is allotted for the multifrequency signal, the signal processing can be well achieved by the use of the above-described signalling frequency lowered to 2 kHz.

As one example, in FIGS. 1a to 1d, the steps of the signal processing are shown in the case where the sampling frequency is lowered from 8 kHz to 2 kHz. At first an original signal sample series is multiplied by a cosine wave signal and a sine wave signal, respectively, having a frequency $f_o$ located at the center of the band where the multifrequency signals exist, and the latter is further multiplied by $j = \sqrt{-1}$ and is substracted from the former. Then, a complex signal having a spectrum as shown in FIG. 1b, which is displaced by $f_o$ in the negative direction along the frequency axis with respect to the spectrum shown at FIG. 1a can be obtained. More particularly, if the original signal series is presented by $st$, the complex $xt$ is represented by the following equation:

$$xt = st \{\cos 2\pi f_o t - \sin 2\pi f_o t\} = st \cdot e^{-j2\pi f_o t} \quad (1)$$

where $t$ represents discrete sampling time points represented in terms of a sampling period T as $t = nT + \tau$ (wherein $n$ is an integrer and $\tau$ is a constant, $O \leq \tau < T$). Here, description has been made of the case where the sine wave signal is multiplied by $j$ and then subtracted from the cosine wave signal. However, the sine wave signal may be multiplied by $j$ and then added to the cosine wave signal, and in this case, a complex signal having a spectrum displaced by $f_o$ in the positive direction along the frequency axis with respect to the spectrum shown at FIG. 1a can be obtained. As far as the hardware is concerned, there is substantially no difference between the above-mentioned addition and subtraction. In the case of the addition, the arrangement of spectrum components with regard to the fundamental band (the frequency band having its center at the origin) is reversed in the frequency axis and therefore, in the following description, subtraction is employed for simplicity of explanation.

In order to reduce the sampling frequency, it is only necessary that, after the complex signal having the spectrum shown in FIG. 1b has passed through a low-pass filter to be converted into a signal series having a spectrum shown in FIG. 1c, signals are partly picked up from the signal series at a predetermined interval. A spectrum example shown at FIG. 1d is the one for the case where the above-mentioned partial pick-up is carried out for every four signal samples to transform the sampling frequency of 8 kHz into 2 kHz. Here, it is to be noted that the spectrum at FIG. 1c has a periodicity of 8 kHz because its sampling frequency is 8 kHz, whereas the spectrum at FIG. 1d has a periodicity of 2 kHz because the sampling frequency is lowered to 2 kHz. Accordingly, the cut-off frequency of the low-pass filter employed in the step from FIG. 1b to FIG. 1c must be selected lower than 1 kHz, and it is also required to give sufficiently large attenuation for the signals outside of the pass band. These signals are a series of a complex data series with a low sampling frequency and consist of two (real and imaginary) data series with respect to a practical hardware implementation. As a result, if the reduction factor of the sampling frequency is smaller than ½, greater reduction of the entire amount of signal processing can be expected. For instance, in the above-mentioned example, the sampling frequency of 8 kHz is reduced to 2 kHz resulting in the reduction factor of the sampling frequency equal to ¼, so that overall reducation of the amount of the signal processing can be reduced by a factor of 2.

The basic principle of the present signal receiver lies in that the signal series subjected to the transformation processing of the sampling frequency as described above is further subjected to a filtering processing in order to detect the respective signal components in the multifrequency signals. The most conventional filtering processing can be realized by providing a plurality of narrow band filters for passing the respective signal components only, but it is also possible to use the Discrete Fourier Transform as described in the above-mentioned Reference 1. Furthermore, under the state where the frequencies of the multifrequency signals are allocated at an equal interval or at an interval equal to an integral multiple of a fixed frequency value, in the above-described process of the transformation of the sampling frequency, the respective signal components of the multifrequency signals are efficiently arranged within the fundamental band. For this reason, if an algorithm of FFT (Fast Fourier Transform) capable of efficiently accomplishing a plurality of Discrete Fourier Transforms is applied thereto, the number of multiplications can be greatly reduced, and as a result, more effective signal processing can be expected. The above-mentioned FFT algorithm is described in greater detail in an article titled "An Algorithm for the Machine Calculation of Complex Fourier Series" in the technical journal *Mathematical computation*, Vol. 19, pp. 297–301 published in April 1965 by The American Matehmatical Society, and in addition, it is disclosed in an article titled "Nonrecursive Digital Filtering Using Cascade Fast Fourier Transformers" on pages 177–183 in *IEEE Transactions on Audio and Electroacoustics*, June 1970 (especially in FIGS. 1 and 2).

Figure 5:
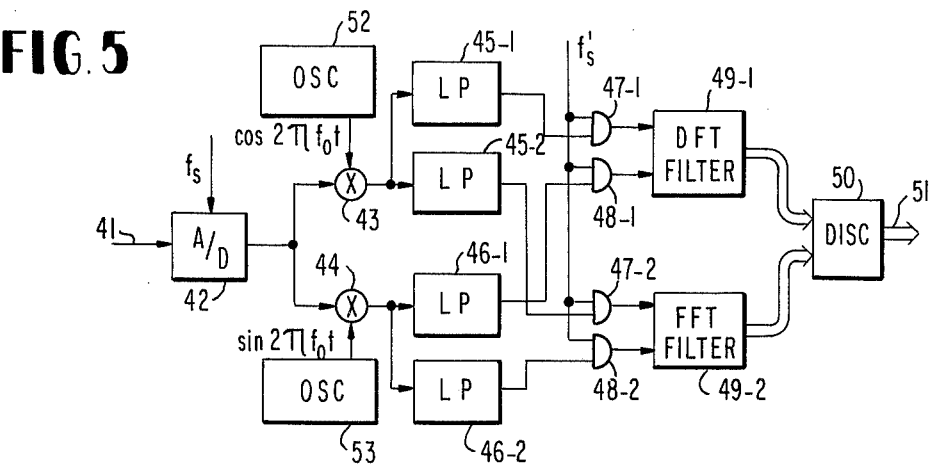
FIG. 5 shows a block diagram of another embodiment of the present invention.

In FIG. 2 which shows one embodiment of the present invention, an audio frequency signal containing multifrequency signals is applied through an input terminal 1 to an analog-digital converter 2, where it is sampled at a sampling frequency $fs$ and converted into a digital quantity having a desired number of bits. It is assumed here that the sampling frequency $fs$ is a set at 8 kHz as the international standard. The audio frequency signal converted into a digital form is sent to multipliers 3 and 4, and in the multiplier 3, it is multiplied by an output $\cos 2\pi f_o t$ of a cosine wave oscillator 12, while in the multiplier 4, it is mulitplied by an output $\sin 2\pi f_o t$ of a sine wave oscillator 13. These oscillators 12 and 13 are realized with the construction as shown in FIG. 5.13 on page 146 of Reference 2 mentioned hereinafter. The frequency $f_o$ of these cosine and sine waves is set at the most desirable frequency for lowering the sampling frequency and for effecting the filtering process, as described previously. For instance, in the case of the No. 5 signalling system, signals arranged between 700 Hz and 2600 Hz are employed, and therefore, if these signals are to be processed as a whole, the value of $f_o$ could be selected at a center value of the above frequency range, that is, somewhere between 1600 Hz and 1700 Hz. However, in view of convenience for the signal processing, it is desirable to select a frequency that can be readily derived from the sampling frequency $fs = 8$ kHz, for example, 1600 Hz obtained by dividing 8 kHz by a factor of 5. A frequency spectrum amplitude of the transformed complex signal according to Equation (1) takes the form as illustrated by solid lines at FIGS. 3a or 3b. In FIGS. 3a and 3b, reference letters A and B indicate spectral lines at 700 Hz and 900 Hz, respectively.

The outputs of the multipliers 3 and 4 are supplied to low-pass filters 5 and 6, respectively, and only the fundamental band components of the multifrequency signals are applied to subsequent sampling gates 7 and 8, respectively. For the purpose of the signal processing for the above-described complex signal, the low-pass filters 5 and 6 are required to have exactly the same transmission characteristics. Preferably, the transmission characteristics are flat within the pass-band, have steep cut-off responses, and can realize a sufficient attenuation outside the pass-band, so that a higher order Butterworth filter or an elliptic filter is suitable therefor. In the present invention, as a filter having such characteristics, a digital filter disclosed in *Digital Processing of Signals*, pp. 66–89 (in particular, FIG. 3.13 and FIG. 3.26) published in 1969 by McGraw-Hill Book Company (Reference 2) can be used. The sampling gates 7 and 8 are composed of ordinary AND circuits.

Timing signals at another sampling frequency $f's$ which is provided separately are supplied to these sampling gates 7 and 8, so that the outputs of the above-mentioned low-pass filters 5 and 6 are converted from the original signal series of sampling frequency $fs$ to another signal series of another sampling frequency $f's$. As described previously, this sampling frequency $f's$ is a integral fraction of the frequency $fs$ which is selected so as not to lose the fundamental band components of the multifrequency signals. For instance, if it is selected in the most general way, $f's = 2$ kHz is selected. In this case, the complex signal has a periodicity of 2 kHz in the amplitude spectrum as shown by the dotted lines in FIG. 3a, As an alternative selection of the sampling frequency $f's$, it is possible to select a frequency lower than 2 kHz. For example, if the frequency is selected at $f's = 1.6$ kHz, the amplitude spectrum of the complex signal has a periodicity of 1.6 kHz as shown by the dotted lines in FIG. 3b. From this figure it is seen that even if the frequency is selected at $f's = 1.6$ kHz, the respective spectral components of the multifrequency signals do not overlap with each other with the result the information in the multifrequency signals is not degraded as far as the No. 5 signalling system is concerned.

The outputs of the sampling gate circuits 7 and 8 are applied to filtering means 9, where the amplitude information of the respective frequency components of the multi-frequency signals is derived. A detailed example of the filtering means 9 is illustrated in FIG. 4. A block 23 in FIG. 4a shows the filtering means 9 constructed of a group of DFT (Discrete Fourier Transform) circuits which perform discrete Fourier transformations. A representative procedure for processing said DFT is known as a Goertzel algorithm as seen on pages 171–172 of Reference 2. Similarly, in the aforementioned Reference 1, this algorithm is used for the DFT circuits. In the figure, the block 23 represents the filtering means, and the outputs of the sampling gates 7 and 8 in FIG. 2 are given to this filtering means 23 through two input terminals 21 and 22, respectively, in FIG. 4a. In the figure, blocks 24-1 to 24-n are a group DFT circuits corresponding to the $n$ multifrequency signal components, and the input fed through the terminal 21 and the other input fed through the terminal 22 are applied to the respective DFT circuits in parallel, as representing a real part and an imaginary part, of the complex signal, respectively. In the discussion with reference to Equation (1), the imaginary part was multiplied by $\sqrt{-1}$, actually, there is no need of such multiplication. Instead, it is only necessary to interpret the Fourier spectrum with the direction of a frequency axis reversed as described previously. Each DFT circuit processes a block of $m$ successive complex sample values in the input complex signal series, and derives at its output one complex spectrum sample value. In the case where the input signal at the input terminal 1 is a sinusoidal wave, each DFT circuit operates similarly to a narrow-band filter, and the value of $m$ determines the frequency separation from FIG. 2 on page 1332 of Reference 1. Assuming that the bandwidth of the narrow-band filter characteritics is represented by $\Delta f$, and taking into consideration the fact that the input sampling frequency is $f's$, the relation of $m \div f's/\Delta f$ is established. For instance, in the case of FIG. 3a, if $f's = 2$ kHz and $\Delta f = 200$ kHz, $m \div 10$ is established.

The real parts and imaginary parts of the outputs of the respective DFT circuits are, after passing through amplitude squaring circuits 25-1 to 25-n and 26-1 to 26-n, respectively, added to each other at adder circuits 27-1 to 27-n, and derived at output terminals 28-1 to 28-n as amplitude information outputs. It is a matter of course that the operation speeds of these various circuits are slower than that of the DFT circuits 24-1 to 24-n in FIG. 4a as will be seen from the above description, that is, a sampling period of $f's/m$ can be obtained. The amplitude squaring circuit is a circuit such that if $x$ is applied to its input, $x^2$ is derived from its output, and it can be realized by giving the same number to a multiplier circuit as a multiplier and multiplicand. Recently, an ROM (read only memory) based on the IC technology has been improved, and so, if the computing word length is short, it will be conveniently constructed in such a manner that a table of $x^2$ is stored in the ROM and reference is made to this table.

In FIG. 4a, assuming that the DFT circuit 24-1 is allotted to 700 Hz and the DFT circuit 24-2 is allotted to 900 Hz, and that at a given time only the spectral line components A and B among the spectral line components represented by the solid lines in FIG. 3a or FIG. 3b are being consecutively transmitted to the present signal receiver, at the terminal 28-1 in FIG. 4a appears a sufficient positive output (A) corresponding to the spectral line component A. At the time, at the terminal 28-2 appears a sufficient positive output (B) corresponding to the spectral line component B, and the outputs at the other terminals 28-3 to 28-n become zero. These amplitude information outputs of the filtering means 23 are given to the discriminating means 10 in FIG. 2, in which the determination is made on which multifrequency signal components have arrived, and the result is derived as a determination output 11. Such discriminating means is basically composed of threshold circuits having memory functions which are provided for the respective outputs of the filtering means 9. One example of the construction of the discriminating means 10 in FIG. 2 is illustrated in FIG. 4a as block 19. Threshold values for the above-described amplitude information outputs 28-1 to 28-n are applied to subtractors 17-1 to 17-n through terminals 16-1 to 16-n, respectively. Normally, all these threshold values take an equal value, but they are not always equal to each other in the case where the transmission characteristics of the above-mentioned low-pass filters 5 and 6 have deviations or in the case where the signalling system per se requires different threshold values. It is to be noted that the positive or negative polarities of the outputs of the subtractors (whether positive or negative being represented by a sign bit) are stored in memory circuits 18-1 tp 18-n, respectively, and derived as determination outputs 20-1 to 20-n. In addition, the discriminating means 10 could include associated means for preventing various erroneous operations, which is adapted to check whether or not the condition of "tow out of six frequency reception" is satisfied in the case where the signals stored in the memory circuits 18-1 to 18-n are the register signals in the aforementioned No. 5 signalling system, or whether or not erroneous operations have been caused by a communication voice in the case that where the stored signals ae supervisory line signals for monitoring the termination of the communication. However, the existence or non-existence of such associated means has no direct bearing on the subject matter of the present invention.

Figure 4B:
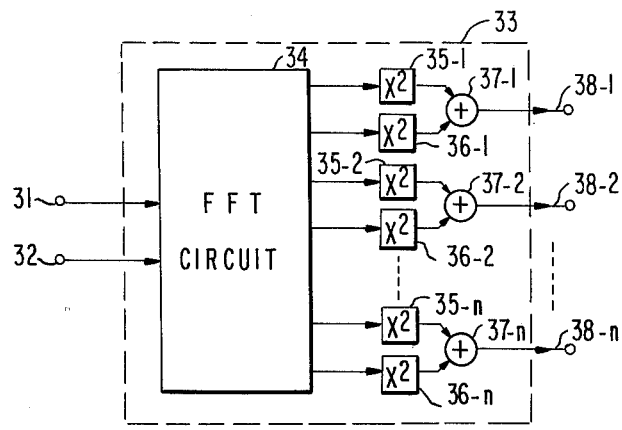

Although one example of a basic construction of the present invention has been described above, the filtering means 9 may be realized in different manner, because in some signalling systems, an equality of intervals between the respective adjacent frequency components of the multi-frequency signals may exist. For instance, in the No. 5 signalling system, if the second sampling frequency $f$'s is selected at 1.6 kHz as shown in FIG. 3b, it can be seen that each frequency component of the multifrequency signals is represented by any one of 16 frequency points selected along a frequency axis at an interval of 100 Hz. In this case, the aforementioned FFT processing becomes more effective. As is well-known, according to the FFT processing, it is possible to calculate spectrum values at $2^N$ (N being an integer) frequency points at a high speed from $2^N$ sampled values. This processing is not only fast but also effective for reducing the scale of the circuit upon practicing the same with practical hardware. In the case of FIG. 3b, the necessary frequency points are 8 in number. Since these 8 frequencies themselves are not arranged at an equal interval, the FFT processing based on at least 16 frequency points selected at an equal interval of 100 Hz is required. In this connection, it is well-known that the FFT processing necessitates $m = 2^N$ consecutive data as input data for satisying the following relation:

$$\Delta F \cdot T = 2^{-N} \tag{2}$$

where $\Delta F$ is a frequency interval of a Fourier transformation output, and T is a sampling period of the input data, which is related to the above-mentioned second sampling frequency $f$'s by an equation $T = 1/f$'s. Consequently, it will be understood that in the example shown in FIG. 3b, N = 4 or higher is required. With regard to the hardware of the FFT, various structures have been known such that an algorithm of the FFT is directly replaced by an N-stage hardware or that a multiplier, an adder and a memory circuit are combined into a unit and used on time-division basis. Since these are well-known technology, there will be no need to describe the details of the construction herein. It is to be noted that a reference numeral 34 in FIG. 4b is an FFT processing circuit which is to be substituted for the DFT circuit group 24 in FIG. 4a, and the remaining parts are common to the both embodiments.

In the above description, an FFT for calculating at least 16 frequency points was necessitated because it was contemplated to process both the supervisory signals and the register signals, simultaneously. However, if the supervisory signals and the register signals are separately processed, the number of the frequency points can be further decreased. For instance, in the case of the No. 5 signalling system, the modulation frequency $f_o$ is selected at 1100 Hz or at 1300 Hz, and the supervisory signal components in the modulated output are separately processed by the aforementioned DFT processing, while the register signal components are, after passing through a low-pass filter such that the supervisory signal components may be cut off, subjected to the second sampling and then, subjected to the FFT processing. With such provisions, the FFT circuit scale becomes $2^N = 8$, that is, N = 3, and thereby further reduction of the circuit scale as a whole can be expected. A more detailed example of such embodiment is illustrated in FIG. 5.

In FIG. 5, the circuit components designated by reference numerals 41 through 53 correspond to the circuit components represented by the reference numerals 1 through 13 in FIG. 2. The distinction between the circuits in FIGS. 5 and 2 exists in that the circuit components designated by reference numerals 45 and 49 in FIG. 5 are arranged in two series. One of the two series is allotted to the processing of supervisory signals, while the other series is allotted to the processing of register signals. In the figure, the circuit components in the first series are represented by reference numerals accomplished by suffix 1 coupled via a hyphen, while those in the latter series are represented by the same numerals accompanied by suffix 2 coupled via a hyphen. Accordingly, the cut-off frequencies of low-pass filters 45-1 and 46-1 are selected so as to pass the supervisory signal components, whereas the cut-off frequencies of low-pass filters 45-2 and 46-2 are determined so as to pass the register signal components but to cut off the supervisory signals. A filtering means 49-1 serves to derive amplitude information of the supervisory signals only, and so, it has the construction shown in FIG. 4a, whereas a filtering means 49-2 serves to process only the register signals arranged at an equal interval in frequencies so that it is composed of FFT processing circuits of the type shown in FIG. 4b. In this case, it is necessary to determine the second sampling frequency so that the relation represented by Equation (2) may be satisfied. It will be readily seen that with the aforementioned circuit construction also, the feature of the present invention can be well embodied.

As has been mentioned above, the No. 5 signalling system has been specifically referred to as one practical example of the signalling systems, the in-band signal receiver of the present invention is equally applicable to other signalling systems so long as they employ similar multifrequency constructions.

It would be apparent that a number of alternatives and modifications can be made within the scope of the present invention defined by the appended claims.

What is claimed is:

1. A multifrequency signal receiver for an in-band audio frequency signalling system, comprising:
    an analog-digital converter for converting an input in-band signal into a digital signal after sampling at a first sampling frequency;
    oscillator means for generating a sine wave and a cosine wave, respectively, having a predetermined frequency at a center portion of the frequency arrangement of the multifrequency signals to be interposed within said band;
    first and second multipliers for providing modulation products of the respective outputs of said oscillator means and the output of said analog-digital converter;
    first and second low-pass filters connected to the respective outputs of said first and second multipliers and having cut-off frequencies preset so as not to affect any one of the multifrequency signals;
    first and second sampling gate circuits for sampling the respective outputs of said first and second low-pass filters at a second sampling frequency having a value of an integral fraction of said first sampling frequency selected within the frequency range so that the multfrequency signal information may not be affected;
    filtering means connected to the respective outputs of said first and second sampling gate circuits for deriving amplitude information possessed by each of the multifrequency signals from the output signals of said first and second sampling gate circuits; and
    discriminating means for determining on the basis of the output of said filtering means which one of the multifrequency signals has arrived at the signal receiver.

2. A multifrequency signal receiver as recited in claim 1, wherein said filtering means comprises:
    a plurality of Discrete Fourier Transform circuits each of which is connected to the respective outputs of said first and second sampling gate circuits and providing first and second outputs representing a real part and an imaginary part, respectively, of a complex signal;
    means for squaring the real part and squaring the imaginary part of each complex signal of said plurality of Discrete Fourier Transform circuits; and
    means for summing the squared real part and the squared imaginary part of each complex signal of each of said Discrete Fourier Transform circuits and generating a plurality of amplitude information outputs as the output of said filtering means.

3. A multifrequency signal receiver as recited in claim 2, wherein said discriminating means comprises:
    threshold means for receiving each of said plurality of amplitude information outputs and providing outputs corresponding to the amplitude information outputs which exceed respective predetermined thresholds; and
    means for storing the outputs of said threshold means.

4. A multifrequency signal receiver as recited in claim 1, wherein said filtering means comprises:
    a Fast Fourier Transform processing circuit connected to the respective outputs of said first and second sampling gate circuits and providing a plurality of first and second outputs representing a real part and an imaginary part, respectively, of a complex signal;
    means for squaring the real part and the imaginary part of each complex signal of said Fast Fourier Transform processing circuit; and
    means for summing the squared real part and the squared imaginary part of each complex signal of said Fast Fourier processing circuit and generating a plurality of amplitude information outputs as the output of said filtering means.

5. A multifrequency signal receiver as recited in claim 4, wherein said discriminating means comprises:
    threshold means for receiving each of said plurality of amplitude information outputs and providing outputs corresponding to the amplitude information outputs which exceed respective predetermined thresholds; and
    means for storing the outputs of said threshold means.

6. A multifrequency signal receiver as recited in claim 1, wherein said multfrequency signals include supervisory signal components and register signal components and said signal receiver further comprises:
    third and fourth low-pass filters connected to the respective outputs of said first and second multipliers and having cut-off frequencies preset so as to pass said register signal components but to cut off said supervisory signal components; and
    third and fourth sampling gate circuits for sampling the respective outputs of said third and fourth low-pass filters at said sampling rate.

7. A multifrequency signal receiver as recited in claim 6, wherein said filtering means comprises:
    a plurality of Discrete Fourier Transform circuits each of which is connected to the respective outputs of said first and second sampling gate circuits and providing first and second outputs representing a real part and an imaginary part, respectively, of a complex signal;
    means for squaring the real part and squaring the imaginary part of each complex signal of said plurality of Discrete Fourier Transform circuits;
    means for summing the squared real part and the squared imaginary part of each complex signal of each of said Discrete Fourier Transform circuits and generating a plurality of amplitude information outputs as an output of said filtering means;
    a Fast Fourier Transform processing circuit connected to the respective outputs of said third and fourth sampling gate circuits and providing a plurality of third and fourth outputs representing a real part and an imaginary part, respectively, of a complex signal;

means for squaring the real part and the imaginary part of each complex signal of said Fast Fourier Transform processing circuit; and means for summing the squared real part and the squared imaginary part of each complex signal and said Fast Fourier processing circuit and generating a plurality of amplitude information outputs as another output of said filtering means.

8. A multifrequency signal receiver as recited in claim 7, wherein said discriminating means comprises:
threshold means for receiving each of said plurality of amplitude information outputs and providing outputs corresponding to the amplitude information outputs which exceed respective predetermined thresholds; and means for storing the outputs of said threshold means.

* * * * *

UNITED STATES PATENT AND TRADEMARK OFFICE
CERTIFICATE OF CORRECTION

PATENT NO. : 4,025,730
DATED : May 24, 1977
INVENTOR(S) : Akira Sawai

It is certified that error appears in the above-identified patent and that said Letters Patent are hereby corrected as shown below:

Col. 2, line 9, delete "Digtal" insert --Digital--
line 48, delete "mutlifrequency" insert --multifrequency- Col. 3, line 9, delete "signle" insert --single--
line 44, delete "st" insert --s(t)--; same line, delete "xt" insert --x(t)--
line 46, equation (1), delete the entire equation and insert:
$$x(t) = s(t) \{\cos 2\pi f_0 f - j \sin 2\pi f_0 t\} \\ = s(t) \cdot e^{-j2\pi f_0 t} \quad (1)$$
line 50, delete "integrer" insert --integer--

Col. 4, line 28, delete "reducation" insert --reduction--
line 58, delete "Matehmatical" insert --Mathematical--

Col. 5, line 61, after "Figure 3a" delete the comma and insert a period

Col. 6, line 39, after "separation" insert --between the respecti DFT circuits as will be apparent--
line 59, after "and" insert --a--

Col. 7, line 5, after "the" (first occurrence) insert --same--
line 31, delete "tp" insert --to--
line 35, delete "tow" insert --two--
line 41, delete "ae" insert --are--

Col. 8, line 56, delete "accomplished" insert --accompanied--

UNITED STATES PATENT AND TRADEMARK OFFICE
CERTIFICATE OF CORRECTION

PATENT NO. : 4,025,730

DATED : May 24, 1977

INVENTOR(S) : Akira Sawai

It is certified that error appears in the above-identified patent and that said Letters Patent are hereby corrected as shown below:

Col. 9, claim 1, line 41, delete "multfrequency" insert --multifrequency--

Col. 10, claim 6, line 36, delete "multfrequency" insert --multifrequency--
line 46, after "said" insert --second--

Col. 11, claim 7, line 6, after "signal" delete "and" insert --of--

Signed and Sealed this

Twenty-second Day of November 19;

[SEAL]

Attest:

RUTH C. MASON
Attesting Officer

LUTRELLE F. PARKER
Acting Commissioner of Patents and Trademar